Jan. 20, 1931.  G. B. SPRING  1,789,393
REENFORCEMENT FOR POLES
Original Filed Aug. 14, 1925
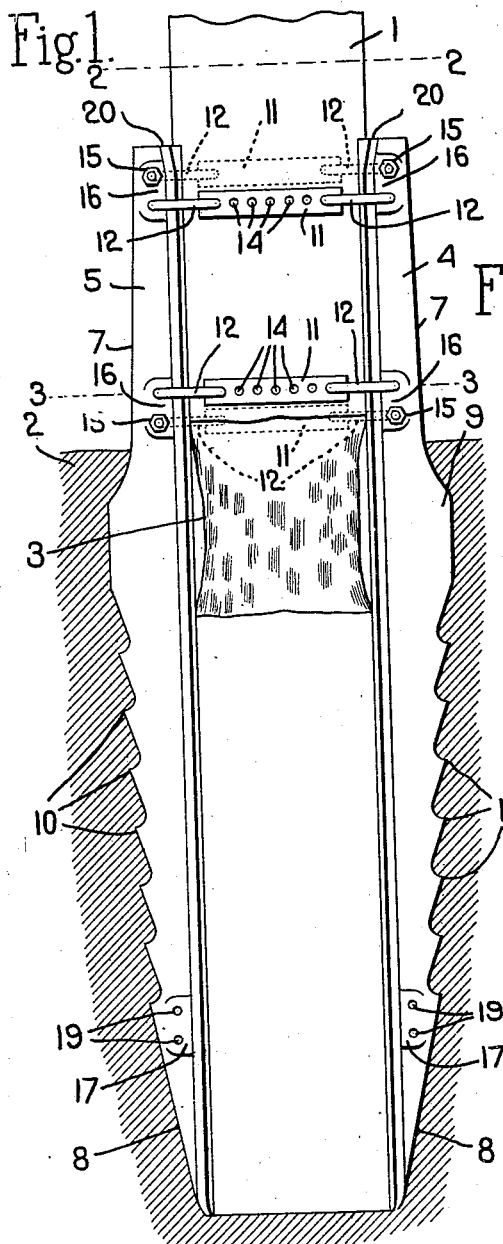
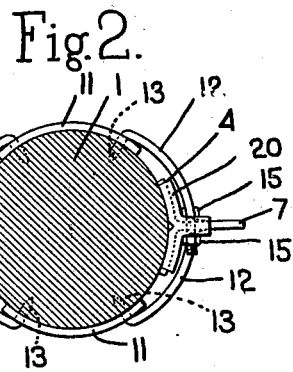
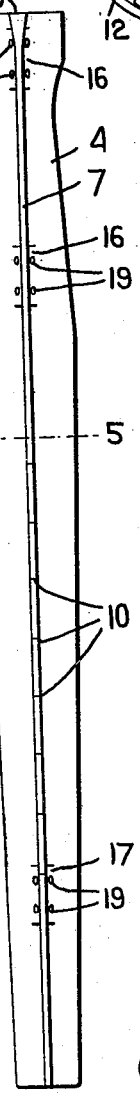
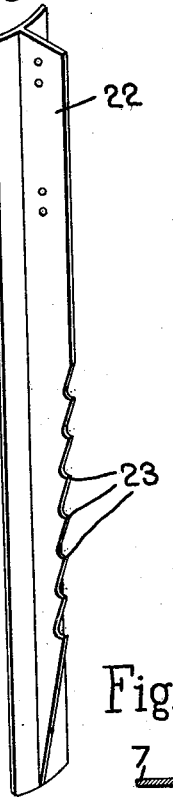
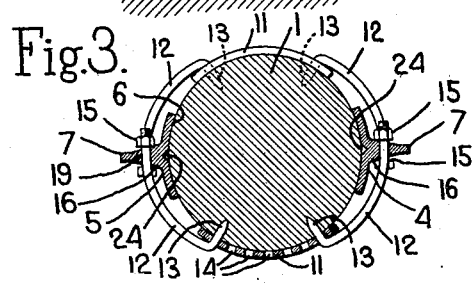
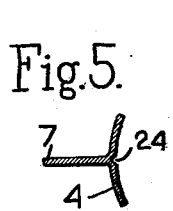
Inventor.
George B. Spring
by Heard Smith & Tennant
Attys.

Patented Jan. 20, 1931

1,789,393

UNITED STATES PATENT OFFICE

GEORGE B. SPRING, OF NEWTONVILLE, MASSACHUSETTS

REENFORCEMENT FOR POLES

Application filed August 14, 1925, Serial No. 50,319. Renewed April 4, 1929.

This invention relates to a means for reenforcing telephone poles, telegraph poles and other similar poles.

After a wooden pole of this nature has been in use for several years it begins to show signs of weakness at the surface of the earth, this weakness being caused by the decay in the pole occasioned by the changes in the degrees of moisture to which the pole is subjected at the surface of the earth.

It is an object of my present invention to provide an improved reenforcement for wooden poles which may be applied to the pole either after it has been set and when it begins to decay or before the pole is set, which reenforcement acts to reenforce and strengthen a weakened pole and make it practically as strong as a new pole.

A pole reenforcement embodying my invention is of that type which comprises two or more reenforcing members adapted to be set into the earth alongside of the pole and which are clamped thereto. In the present embodiment of the invention the reenforcing members have a general T shape in cross section, each member having a curved inner face to fit the exterior of the pole and a longitudinally-extending rib on the outer face, the edge of which is preferably serrated. These reenforcing members are clamped to the pole by a novel clamping means which is constructed to have an interlocking engagement with the pole.

In order to give an understanding of my invention I have illustrated in the drawings some selected embodiments thereof which will now be described after which the novel features will be pointed out in the appended claims.

Fig. 1 is a view illustrating my improved reenforcing means in use for reenforcing a pole;

Fig. 2 is a section on the line 2—2, Fig. 1;

Fig. 3 is a section on the line 3—3, Fig. 1;

Fig. 4 is a side view of one of the reenforcing members;

Fig. 5 is a cross section through the reenforcing member on the line 5—5, Fig. 4;

Fig. 6 is a perspective view showing a different embodiment of the invention.

In the drawings 1 indicates a wooden pole such as is used for telegraph, telephone and other transmission purposes, said pole being set in the earth 2. The pole is shown as weakened by decay at the surface of the earth as shown at 3, this being a condition which frequently exists in poles that have been set for a few years.

The reenforcing means herein shown is of that type comprising two reenforcing members adapted to be driven or set into the earth on opposite sides of the pole and then clamped to the pole. The two reenforcing members shown in Fig. 1 are indicated at 4 and 5 respectively. Each member has a general T shape in cross section, it being formed with a concave inner face 6 adapted to rest against the pole and the outwardly-extending rib 7 which preferably extends the full length of the member. These members may conveniently be of a length to extend to the bottom of the pole and also to extend some distance above the earth 2. For average use a reenforcing member about 6 feet long will answer the purpose.

The lower end of each reenforcing member is tapered or pointed as shown at 8 so as to facilitate its being driven into the earth.

The rib 7 of each member will preferably be made wider at its central portion as shown at 9, this wider portion affording good anchorage in the earth 2 when the reenforcing members are set into the earth to the depth shown in Fig. 1. The rib is shown as gradually decreasing in width from said wider portion 9 to the lower end.

The edge of that portion of each rib 7 which is embedded in the earth is preferably serrated as shown at 10 and the serrations are so formed as to provide upwardly-directed teeth. An advantage of this is that these teeth afford an increased anchorage in the earth and resist any tendency of the reenforcing members to move upwardly.

The reenforcing members are clamped to the pole by a novel clamping means which consists of perforated plates 11 and clamping dogs 12 which connect said plates with the ribs 7. Each clamping dog 12 is provided at one end with an inwardly-directed nose 13 which is adapted to be entered through one of the openings 14 in a plate 11 and to be driven into the pole 1. The other end of each clamping dog extends through an aperture 19 in the rib 7 of one of the clamping members and is screw-threaded to receive a clamping nut 15. I will employ as many of these clamping devices as necessary but for ordinary purposes it will be sufficient to clamp the reenforcing members to the poles at a point just above the earth and again at a point near the top of the reenforcing members. At each point two such clamping devices are employed, one on each side.

In order to strengthen the structure I will preferably reenforce or thicken the ribs 7 at the points where the dogs 12 pass therethrough as shown at 16. The reenforcing members are also shown as having the ribs 7 thickened near the lower end as shown at 17, each thickened portion 17 being provided with apertures 19 to receive the clamping dogs.

When the reenforcing members are to be applied to a weakened pole after it has been set said members will be driven into the earth on each side of the pole and when they have been driven to the proper depth the clamping means will be applied. This may be done by placing the plates 11 in position against the pole, inserting the screw-threaded ends of the clamping dogs through the apertures 19 and applying the nuts 15 thereto sufficient to hold the dogs in place and then inserting the noses 13 of the dogs through the appropriate apertures 14 in the plates 11 and driving the dogs home. After this is done the nuts 15 are tightened so as to tighten the clamps firmly about the pole. In this way the clamps not only clamp the reenforcing members to the pole but they are interlocked with or anchored to the pole so as to prevent the pole from turning.

I have shown the upper end of the reenforcing member as thickened somewhat as illustrated at 20 so as to provide a sort of head portion which may be struck by a sledge hammer or pile driver for driving the reenforcing member into place. If the reenforcing members are to be applied to the pole before it is set then I will also preferably employ a clamping means at the lower end thereof where the apertures are formed through the thickened portion 17 so that the device is clamped to the pole at both the top and bottom. The pole may then be set in usual way and the reenforcing members will be in place to take the strain whenever the pole begins to weaken by decay.

The construction shown in Figs. 1 to 4 is one which could be conveniently made of cast metal.

In Fig. 6 I have illustrated a slightly different embodiment wherein the reenforcing members are made of commercial T iron. In this construction the cross member 21 of the T iron will be bent slightly so as to conform to the curvature of the pole and the rib 22 corresponds to the rib 7 of the cast metal construction and provides the anchoring rib which is embedded in the earth. In this embodiment, too, the edge of the rib is serrated or toothed as shown at 23 to give the reenforcing members a better anchorage in the earth.

The cast metal construction shown in Figs. 1 to 5 has a groove 24 formed on its inner face and extending longitudinally thereof.

The construction of the plate 11 with its plurality of apertures 14 provides an adjustable clamp adapted for different sizes of poles. If the pole is a small one then the toes 13 of the dogs will be inserted through the apertures 14 nearer the center of the plate while in the case of a large pole said toes will be inserted through the apertures nearer the end of the plate.

I claim:

1. A reenforcement for a pole which is set into the earth, said reenforcement comprising reenforcing members adapted to be set into the earth alongside of the pole in spaced relation, each member having as an integral part thereof a longitudinally-extending rib on its outer face, the upper end of which is thickened sufficiently to form a head which is integral with the member for receiving blows for driving the reenforcing member into the earth alongside of the pole, and clamping means connecting said ribs and clamping the reenforcing members to the pole, said connected clamping means and members completely encircling the pole and the clamping means having engagement with the pole between the reenforcing members.

2. A reenforcement for a pole which is set into the earth, said reenforcement comprising reenforcing members adapted to be set into the earth alongside of the pole, each reenforcing member having a longitudinally-extending rib on its outer face, adjustable clamping means connecting said ribs and clamping the reenforcing members to the pole, said clamping means comprising perforated plates situated between the reenforcing members and adapted to rest against the pole, each plate having a dimension circumferentially of the pole less than the distance between the reenforcing members and dog members extending circumferentially of the pole and connecting each plate to the ribs of the reenforcing members on opposite sides thereof.

3. A reenforcement for poles comprising two reenforcing members adapted to be set into the earth on opposite sides of the pole, each reenforcing member having a longitudinally-extending rib and clamping means connecting said ribs and clamping the reenforcing members to the pole, said clamping means comprising perforated plates and dog members which are adjustably secured to the ribs and are provided with inwardly-bent ends which extend through the perforations in the plates and are anchored in the pole.

4. A reenforcement for poles comprising reenforcing members adapted to be placed around the pole, and means for clamping said members to the pole, said clamping means comprising perforated plates and clamping dogs adjustably secured to the reenforcing members and having inturned noses entering the apertures of said plates and adapted to be embedded in the pole.

5. A reenforcement for poles comprising reenforcing members adapted to be placed about the pole in spaced relation, each member having as an integral part thereof a longitudinally-extending rib on its outer face, the upper end of the rib of each member and also the upper portion of each member adjacent each rib being thickened to form a head which is integral with the member to receive blows for driving the member into the earth alongside of the pole, and adjustable clamping members connecting the ribs of the reenforcing members and clamping said members to the pole, said clamping members having engagement with the pole between the reenforcing members.

6. A reenforcement for poles comprising reenforcing members adapted to be placed about the pole, each member having a longitudinally-extending rib on its outer face, the upper end of the rib of each member and also the upper portion of each member adjacent each rib being thickened to form a head to receive blows for driving the member into the earth alongside of the pole, and adjustable clamping members connecting the ribs of the reenforcing members and clamping said members to the pole, said connecting clamping members and reenforcing members completely encircling the pole and the clamping members having interlocking engagement with the pole between the reenforcing members.

7. A reenforcement for a pole which is set into the earth, said reenforcement comprising reenforcing members adapted to be driven into the earth alongside of the pole, adjustable clamping means connecting said reenforcing members and clamping the latter to the pole, said clamping means comprising perforated plates situated between the reenforcing members and adapted to rest against the pole, each reenforcing member having a length circumferentially of the pole less than the distance between the reenforcing members, and dog members extending circumferentially of the pole and connecting each plate to the reenforcing members on opposite sides thereof.

8. A reenforcement for a pole which is set into the earth, said reenforcement comprising reenforcing members adapted to be driven into the earth alongside of the pole, adjustable clamping means connecting said reenforcing members and clamping the latter to the pole, said clamping means comprising perforated plates situated between the reenforcing members, said plates having a dimension circumferentially of the pole less than the distance between the reenforcing members and the perforated portions of the plates resting against the pole, and dog members extending circumferentially of the pole and connecting the perforated plates to the reenforcing members, one end of each dog engaging the plate through a perforation therein.

In testimony whereof, I have signed my name to this specification.

GEORGE B. SPRING.